United States Patent [19]
Hikichi et al.

[11] Patent Number: 5,835,706
[45] Date of Patent: Nov. 10, 1998

[54] METHOD OF CONTROLLING DATA WRITING INTO ON-BOARD MICROCOMPUTER

[75] Inventors: Hiroshi Hikichi; Takashi Igaue, both of Kanagawa, Japan

[73] Assignee: NEC Corporation, Tokyo, Japan

[21] Appl. No.: 772,770

[22] Filed: Dec. 24, 1996

[30] Foreign Application Priority Data

Jan. 17, 1996 [JP] Japan ................................. 8-005890

[51] Int. Cl.⁶ ................................................. G06F 11/08
[52] U.S. Cl. ............................ 395/185.02; 395/182.12; 395/182.2; 365/228
[58] Field of Search .................... 395/185.02, 182.12, 395/182.2, 182.21, 185.04; 364/246.6, 266.2; 365/228, 226

[56] References Cited

U.S. PATENT DOCUMENTS 5,349,669  9/1994  Arai et al. .............................. 365/228
5,375,246 12/1994  Kimura et al. ........................ 395/182.2
5,444,664  8/1995  Kuroda et al. .

FOREIGN PATENT DOCUMENTS 4332769 12/1994  Germany .
4-160539  6/1992  Japan .

OTHER PUBLICATIONS

Patent Abstracts of Japan, vol. 096, No. 002, Feb. 29, 1996.

*Primary Examiner*—Robert W. Beausoliel, Jr.
*Assistant Examiner*—Pierre E. Elisca
*Attorney, Agent, or Firm*—Sughrue, Mion, Zinn, Macpeak & Seas, PLLC

[57] ABSTRACT

A user board has an on-board microcomputer including a flash memory and an on-board writing program memory, a user circuit, a reset circuit, a first OR gate, and a second OR gate. A detected signal for resetting the user circuit in an on-board writing mode is supplied from an on-board writing host through the second OR gate to prevent the user circuit from affecting a writing control signal and data to be written into the flash memory.

9 Claims, 6 Drawing Sheets

METHOD OF CONTROLLING DATA WRITING INTO ON-BOARD MICROCOMPUTER

BACKGROUND OF THE INVENTION

1. Field of the Invention

The present invention relates to a method of controlling the writing of data into an on-board microcomputer which has been installed on a user board, and more particularly to a method of controlling the writing of data into an on-board microcomputer which has a built-in flash electrically erasable and programmable read-only memory (hereinafter also referred to as a "flash memory").

2. Description of the Related Art

Heretofore, a method of controlling the writing of data into an on-board microcomputer has generally been used in the art as disclosed in Japanese unexamined patent publication No. 4-160539, for example.

FIG. 1 of the accompanying drawings shows a user board and a writing host for illustrating such a conventional method of controlling the writing of data into an on-board microcomputer. As shown in FIG. 1, according to the conventional method, the writing of data into a flash memory 5 of an on-board microcomputer 2 installed on a user board 1 is controlled by an on-board writing host 9.

The user board 1 has the microcomputer 2, a user circuit 3 including various electronic circuits such as a serial interface function block 7, a malfunction monitoring device 8, etc., a reset circuit 4 for resetting the microcomputer 2 and the user circuit 3, an OR gate 14 for ORing resetting signals from the reset circuit 4 and the on-board writing host 9, and a control interface 10 which interconnects the microcomputer 2 and the user circuit 3. The microcomputer 2 has two memory areas one of which serves to store a main program for controlling the user circuit 3 and is implemented by the flash memory 5. The other one of the memory areas serves to store an on-board writing program for writing data into the flash memory 5 and is implemented by an on-board writing program memory 6. These memory areas 5, 6 are mapped with addresses different from each other.

The reset circuit 4 is energized after the user board 1 is switched on or when a reset button is pressed. The on-board writing host 9 controls a terminal for writing data into the flash memory 5 in the microcomputer 2, and transmits such data to the microcomputer 2.

The malfunction monitoring device 8 in the user circuit 3 serves to confirm normal operation of the microcomputer 2.

The control interface 10 serves to control the user circuit 3 with signals between the microcomputer 2 and the user circuit 3 upon inputting and outputting of data. Serial interfaces (I/F) 37, 38, 39 comprise a line for outputting serial data from the microcomputer 2, a line for inputting serial data to the microcomputer 2, and a clock line for transferring the serial data. These serial interfaces 37, 38, 39 serve as not only interfaces between the microcomputer 2 and the user circuit 3, but also interfaces for data transmission and reception between the microcomputer 2 and the on-board writing host 9. The serial interfaces 37, 38, 39 are connected between serial interface terminals 28, 29, 30 of the serial interface function block 7 and terminals 31, 32, 33 of the microcomputer 2, and also connected to a serial data input terminal 34, a serial data output terminal 35, and a serial data transfer clock terminal 36 of the on-board writing host 9.

A high-voltage signal 11 for writing data into the flash memory 5 is supplied from the on-board writing host 9 to a high-voltage (Vpp) terminal 13 of the microcomputer 2, and a reset signal 12 for writing data into the flash memory 5 is supplied from the on-board writing host 9 to the OR gate 14. A reset signal 15 outputted from the reset circuit 4 is supplied to the OR gate 14. When the reset circuit 4 detects an output signal 16 from the malfunction monitoring device 8, the reset circuit 4 activates the reset signal 15. An output signal 19 from the OR gate 14 is transmitted to a reset terminal 20 of the microcomputer 2 and a reset terminal 21 of the user circuit 3.

A signal 17 which is outputted from an arbitrary output terminal 18 of the microcomputer 2 is a predetermined signal or predetermined data periodically transmitted by the main program stored in the flash memory 5.

The user board 1 operates alternatively in two modes, i.e., a normal operation mode and an on-board data writing mode. In the normal operation mode, the microcomputer 2 executes the main program to control the user circuit 3. In the on-board data writing mode, the microcomputer 2 executes the on-board writing program stored in the on-board writing program memory 6 to write data into the flash memory 5 according to an instruction from the on-board writing host 9. The on-board data writing mode is carried out as when a bug contained in the main program is to be corrected or when the main program is to be modified for an additional function or functions.

Actually, the user board 1 also has a reset mode in addition to the above two modes. In the reset mode, the output signal 19 from the OR gate 14 is rendered active to initialize the operation of the microcomputer 2 and the user circuit 3.

The above modes of operation of the user board 1 will be described below.

FIG. 2 of the accompanying drawings shows a timing chart of operation of the circuit arrangement illustrated in FIG. 1, showing various signals and terminal states therein. If the main program for controlling the user circuit 3 resides in the flash memory 5, the user board 1 is operated in the normal operation mode as follows: While the on-board writing host 9 is inactivating the high-voltage signal 11, the reset signal 12, and the serial interface and clock terminals 34, 35, 36 thereof, the user board 1 is turned on. The reset signal 15 is now inactivated, and the main program is executed by the microcomputer 2 to operate the user board 1 in the normal operation mode. In the normal operation mode, the microcomputer 2 controls the user circuit 3 in various ways through the control interface 10 and the serial interfaces 37, 38, 39. The malfunction monitoring device 8 receives in each of certain intervals of time a predetermined signal or predetermined data outputted from the terminal 18 of the microcomputer 2 under the control of the main program for thereby confirming normal operation of the microcomputer 2. If the malfunction monitoring device 8 fails to receive such a predetermined signal or predetermined data within a certain interval of time, then the malfunction monitoring device 8 activates its output signal 16. The reset circuit 15 detects the activated output signal 16, and activates its reset signal 15, whereupon the OR gate 14 supplies its output signal 19 as a reset signal to the microcomputer 2 and the user circuit 3.

If the main program for controlling the user circuit 3 does not reside in the flash memory 5, i.e., if data are to be written into the flash memory 5 in the on-board data writing mode, then the on-board writing host 9 supplies the high-voltage signal 11 and the reset signal 12, causing the microcomputer 2 to execute the on-board writing program stored in the on-board writing program memory 6. The contents of the on-board writing program mainly serve the purpose of transferring serial data through the serial interfaces 37, 38, 39 to transmit data to be written from the on-board writing host 9 therethrough to the microcomputer 2. The serial interfaces 37, 38, 39 are used to transmit data to be written for the reason that they require a relatively small number of terminals. Of course, it is possible for the microcomputer 2 to have dedicated interfaces for transmitting and receiving data to be written. However, such dedicated interfaces would reduce the number of terminals that can be used in the normal operation mode of the user board 1. The serial interfaces 37, 38, 39 can be used in both the normal operation mode and the on-board data writing mode.

While the user board 1 is operating in the on-board data writing mode, the main program for transmitting a predetermined signal or predetermined data is not executed. In the on-board data writing mode, both the reset signal 12 for writing data into the flash memory 5 and the reset signal 15 outputted from the reset circuit 4 are inactive, and hence the output signal 19 from the OR gate 14 is inactive. As a result, the user circuit 3 is operating.

In the normal operation mode, the microcomputer 2 transmits a predetermined signal or predetermined data to the malfunction monitoring device 8 in each of certain intervals of time while it is executing the main program. In the on-board writing mode, however, the microcomputer 2 is not transmitting such a predetermined signal or predetermined data because it is executing the on-board writing program. Therefore, the malfunction monitoring device 8 is unable to receive a predetermined signal or predetermined data in the on-board writing mode.

In the on-board writing mode, it generally takes several seconds to ten and several seconds to write data into the flash memory 5. In those ten and several seconds, the output signal 16 from the malfunction monitoring device 8 may become active, resulting in accidental resetting of the microcomputer 2.

Since the user circuit 3 is in operation in the on-board writing mode, the serial interface function block 7 may transmit serial data while data are being written into the flash memory 5 during several seconds to ten and several seconds in the on-board writing mode. Consequently, signals may be mixed in the serial interfaces 37, 38, 39 which are used in both the normal operation mode and the on-board data writing mode.

In the on-board writing mode, though the CPU of the microcomputer 2 is not operating, various other drawbacks may possibly take place because the user circuit 3 is released from a reset condition.

While the user board 1 is in the normal operation mode, after the reset signal 15 from the reset circuit 4 is made inactive, the microcomputer 2 transmits a predetermined signal or predetermined data to the malfunction monitoring device 8 in each of certain intervals of time under the control of the main program for the purpose of indicating that the microcomputer 2 is in normal operation.

In the on-board writing mode, however, since the microcomputer 2 is executing the on-board writing program, it is unable to transmit such a predetermined signal or predetermined data to the malfunction monitoring device 8. Therefore, the malfunction monitoring device 8 tends to decide that the microcomputer 2 is malfunctioning, and renders its output signal 16 active.

With the conventional method of controlling the writing of data into the flash memory 5, therefore, the malfunction monitoring device 8 may activate its output signal 16 in the on-board writing mode, supplying a reset signal to the microcomputer 2. When this happens, data cannot be written into the flash memory 5 in the on-board writing mode.

According to the conventional method, furthermore, while the user board 1 is in the on-board writing mode, after the reset signal 12 from the on-board writing host 9 is made inactive, the user circuit 3 is also released from a reset condition. Inasmuch as the serial interfaces 37, 38, 39 double as interfaces connected to the user circuit 3 and the on-board writing host 9, a clock signal for transferring serial data and serial data are simultaneously transmitted from the user circuit 3 and the on-board writing host 9 to the microcomputer 2, and hence are mixed in the serial interfaces 37, 38, 39.

When the signals are mixed or shorted in the serial interfaces 37, 38, 39 in the on-board writing mode, data may not be written into the flash memory 5 or the user board 1 may be damaged.

In the conventional method, the malfunction monitoring device 8 in the user circuit 3 and the serial interfaces 37, 38, 39 pose problems as described above. Furthermore, since the user circuit 3 is released from a reset condition though the CPU of the microcomputer 2 is not normally operating in the on-board writing mode, various other shortcomings may also possibly be caused.

SUMMARY OF THE INVENTION

It is therefore an object of the present invention to provide a highly reliable method of controlling the writing of data into an on-board microcomputer to allow the data to be written in a wide range of situations while preventing interface signals from being mixed thereby to protect a user board against damage.

According to an aspect of the present invention, there is provided a method of controlling the writing of data on a user board having a user circuit including a serial interface function block and a malfunction monitoring device, an on-board microcomputer including a flash memory which stores a control main program and an on-board writing program memory which stores an on-board writing program and connected to the user circuit through serial interfaces, a reset circuit for generating a reset signal in response to an output signal from the malfunction monitoring device, a first OR gate for ORing the reset signal from the reset circuit and a reset signal supplied from an on-board writing host for rewriting data stored in the flash memory, and a second OR gate for ORing an output signal from the first OR gate and a detected signal indicative of an on-board writing mode from the on-board writing host to reset the user circuit, the method comprising the steps of supplying a high-voltage signal having a voltage higher than a power supply voltage from the on-board writing host to energize the on-board writing program memory for thereby indicating a start of the on-board writing mode, transmitting data to be written into the flash memory from the on-board writing host to the on-board microcomputer, and resetting the user circuit wholly or partly with the detected signal in the on-board writing mode.

According to another aspect of the present invention, there is provided a method of controlling the writing of data on a user board having a user circuit including a serial interface function block and a malfunction monitoring device, an on-board microcomputer including a flash memory which stores a control main program and an on-board writing program memory which stores an on-board writing program and connected to the user circuit through serial interfaces, a reset circuit for generating a reset signal in response to an output signal from the malfunction monitoring device, a first OR gate for ORing the reset signal from the reset circuit and a reset signal supplied from an on-board writing host for rewriting data stored in the flash memory, and a second OR gate for ORing an output signal from the first OR gate and a detected signal indicative of an on-board writing mode from the on-board microcomputer to reset the user circuit, the method comprising the steps of supplying a high-voltage signal having a voltage higher than a power supply voltage from the on-board writing host to energize the on-board writing program memory for thereby indicating a start of the on-board writing mode, transmitting data to be written into the flash memory from the on-board writing host to the on-board microcomputer, and resetting the user circuit wholly or partly with the detected signal in the on-board writing mode.

According to still another aspect of the present invention, there is provided a method of controlling the writing of data on a user board having a user circuit including a serial interface function block and a malfunction monitoring device, a reset circuit for generating a reset signal in response to an output signal from the malfunction monitoring device, a first OR gate for ORing the reset signal from the reset circuit and a reset signal supplied from an on-board writing host, and an on-board microcomputer including a flash memory which stores a control main program, an on-board writing program memory which stores an on-board writing program, a high-voltage detector, and a second OR gate for ORing a detected signal indicative of an on-board writing mode supplied from the high-voltage detector and an output signal from the first OR gate, the on-board microcomputer being connected to the user circuit through serial interfaces, the method comprising the steps of supplying a high-voltage signal having a voltage higher than a power supply voltage from the on-board writing host to energize the on-board writing program memory for thereby indicating a start of the on-board writing mode, transmitting data to be written into the flash memory from the on-board writing host to the on-board microcomputer, and resetting the user circuit wholly or partly with the detected signal in the on-board writing mode.

The above and other objects, features, and advantages of the present invention will become apparent from the following description referring to the accompanying drawings which illustrate examples of preferred embodiments of the present invention.

DETAILED DESCRIPTION OF THE PREFERRED EMBODIMENTS

Figure 1:
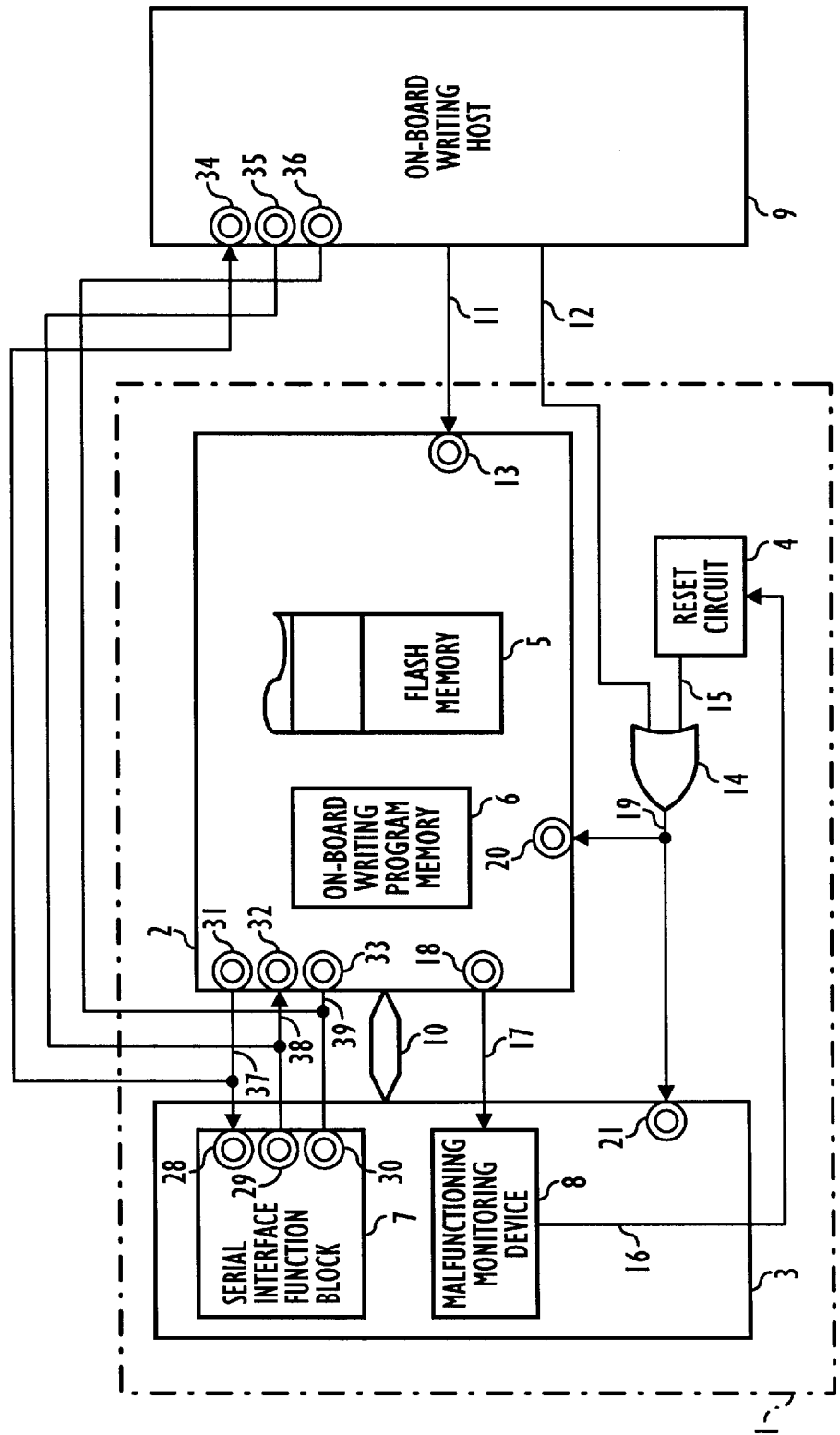
FIG. 1 is a block diagram of a user board and an on-board writing host, illustrative of a conventional method of writing of data into an on-board microcomputer.
Figure 2:
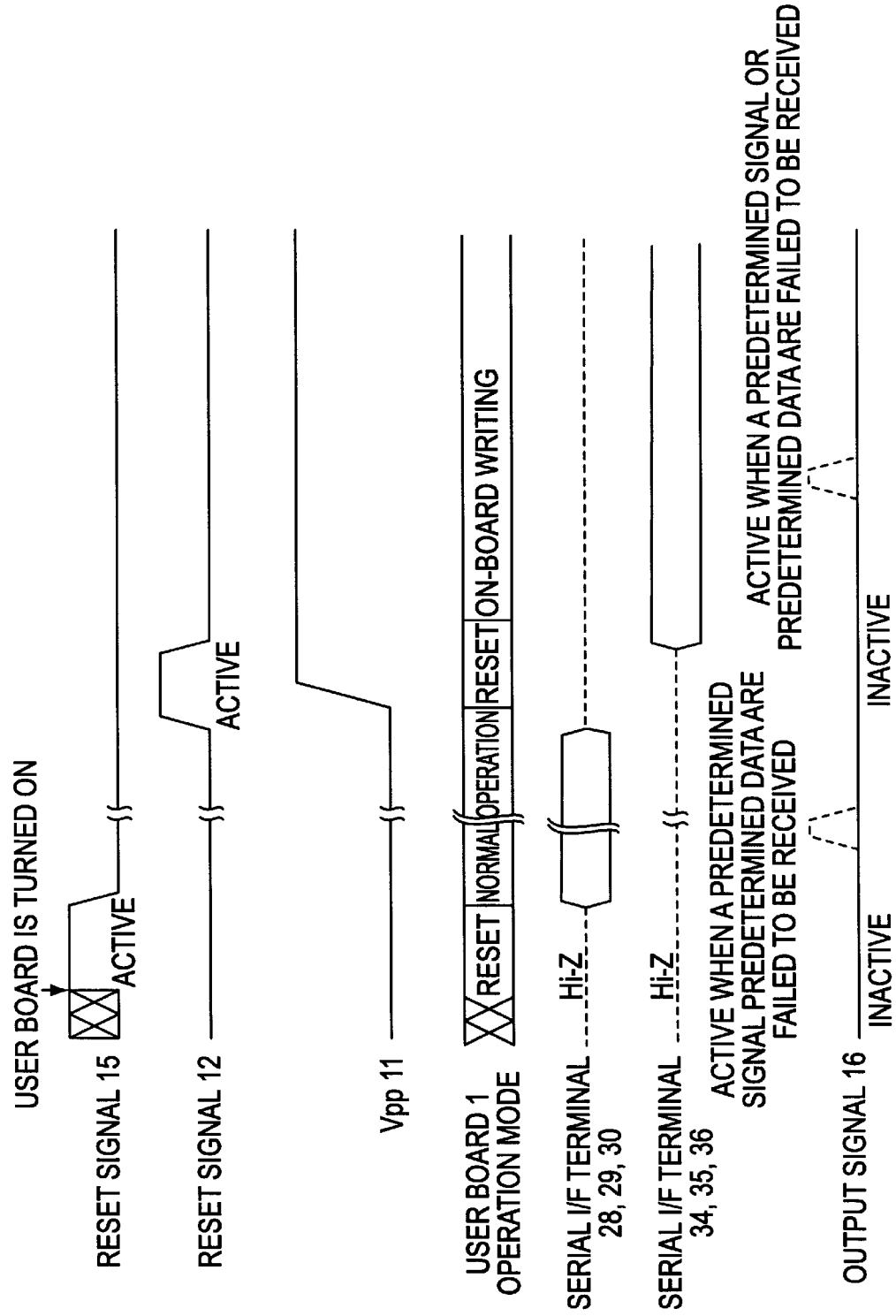
FIG. 2 is a timing chart showing various signals and terminal states in the user board and the on-board writing host shown in FIG. 1.

Identical reference numerals denote identical parts throughout views.

Figure 3:
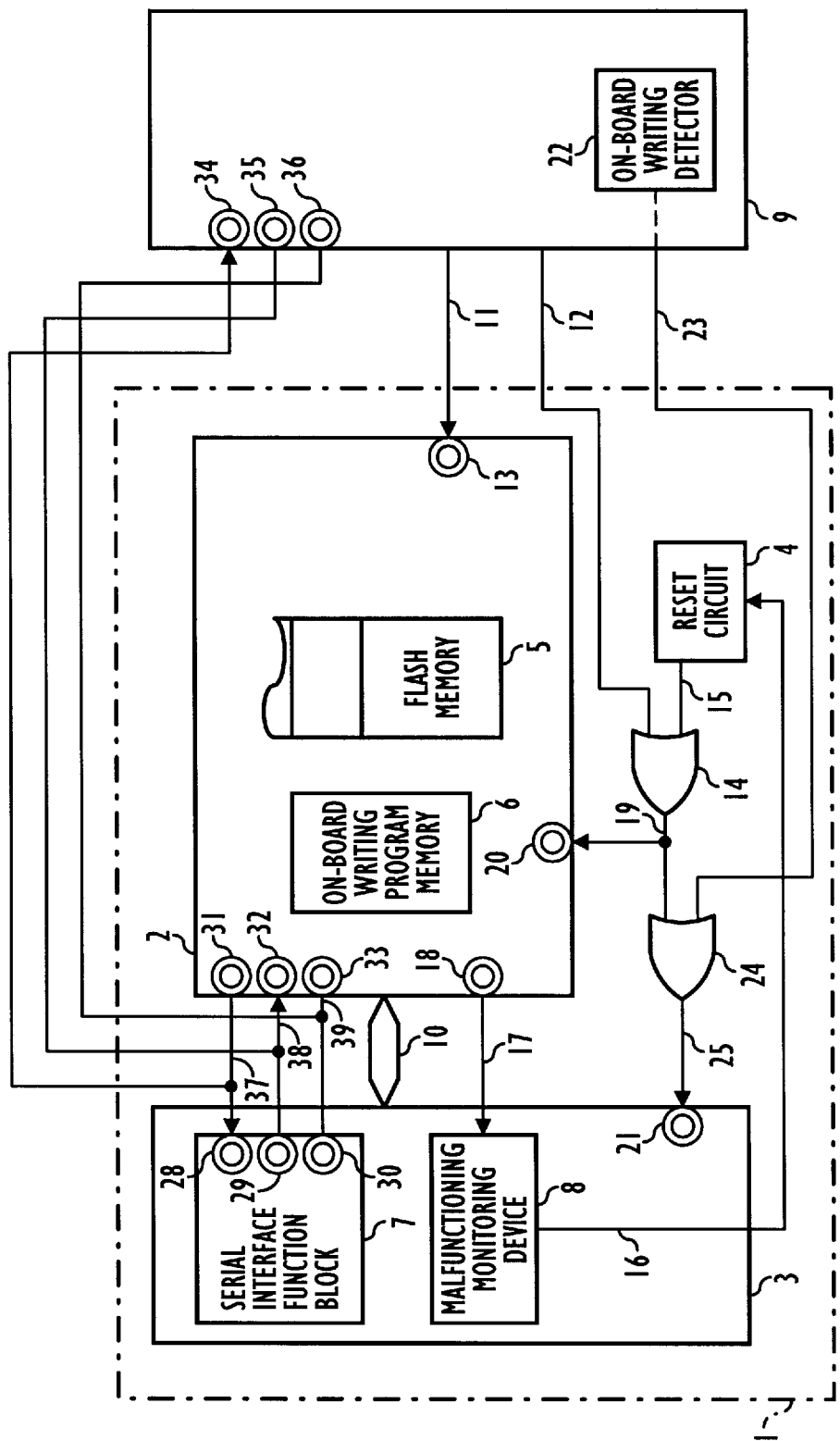
FIG. 3 is a block diagram of a user board and an on-board writing host, illustrative of a method of writing of data into an on-board microcomputer according to an embodiment of the present invention.

FIG. 3 shows in block form a user board 1 and an on-board writing host 9, illustrative of a method of writing of data into an on-board microcomputer according to an embodiment of the present invention. As shown in FIG. 3, the user board 1 has a user circuit 3 including a serial interface function block 7 and a malfunction monitoring device 8, an on-board microcomputer 2 having a flash memory 5 which stores a control main program and an on-board writing program memory 6 which stores an on-board writing program and connected to the user circuit 3 through serial interfaces 37, 38, 39 and a control interface 10, a reset circuit 4 for generating a reset signal 15 in response to an output signal 16 from the malfunction monitoring device 8, and a first OR gate 14 for ORing the reset signal 15 from the reset circuit 4 and a reset signal 12 supplied from the on-board writing host 9 for rewriting data stored in the flash memory 5. The above details of the user board 1 are identical to those of the user board 1 shown in FIG. 1. According to the present invention, the on-board writing host 9 has an on-board writing detector 22 for outputting a detected signal 23 when data are written into the flash memory 5 in the on-board writing mode, and the user board 1 further has a second OR gate 24 for ORing an output signal from the first OR gate 14 and the detected signal 23 indicative of the on-board writing mode from the on-board writing detector 22 to reset the user circuit 3.

For writing data into the flash memory 5 in the on-board writing mode, a high-voltage signal (Vpp) 11 having a voltage higher than a power supply voltage is supplied from the on-board writing host 9 to energize the on-board writing program memory 6 for thereby indicating a start of the on-board writing mode. Thereafter, the on-board writing host 9 transmits data to be written into the flash memory 5 through a serial data input terminal 34, a serial data output terminal 35, and a serial data transfer clock terminal 36 thereof to the microcomputer 2. During the on-board writing mode, all or part of the user circuit 3 are reset by the detected signal 23 from the on-board writing detector 22.

Therefore, the user board 1 and the on-board writing host 9 according to the embodiment shown in FIG. 3 differ from those according to the conventional arrangement shown in FIG. 1 in that the user board 1 has the second OR gate 24, the on-board writing host 9 has the on-board writing detector 22, the detected signal 23 indicative of the on-board writing mode from the on-board writing detector 22 and the output signal 19 from the first OR gate 14 are supplied to the second OR gate 24, and an output signal 25 from the second OR gate 24 is supplied to the reset terminal 21 of the user circuit 3.

Figure 4:
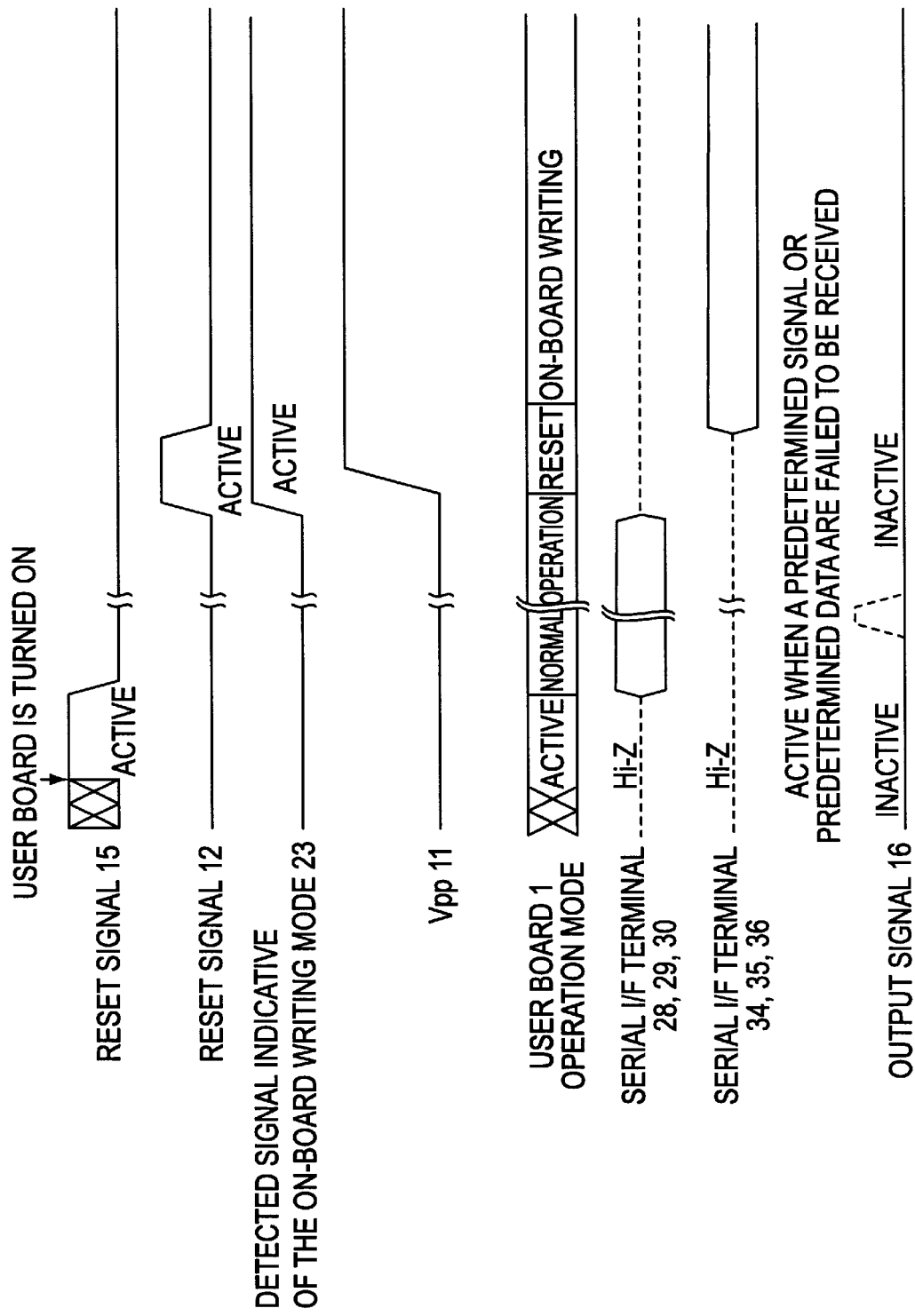
FIG. 4 is a timing chart showing various signals and terminal states in the user board and the on-board writing host shown in FIG. 3.

FIG. 4 shows a timing chart of operation of the circuit arrangement illustrated in FIG. 3, showing various signals and terminal states therein. As shown in FIG. 4, the user board 1 operates in a normal operation mode, an on-board writing mode, and a reset mode.

When the reset signal 15 is inactivated after the user board 1 is switched on, the on-board writing host 9 inactivates the high-voltage signal 11, the reset signal 12, the serial interfaces 37, 38, 39, and the detected signal 23 indicative of the on-board writing mode. Therefore, the user board 1 is in the normal operation mode. In the normal operation mode, the user board 1 operates in the same manner as with the conventional user board 1 shown in FIG. 1.

For writing data into the flash memory 5 in the on-board writing mode, the on-board writing host 9 connects itself to the serial interfaces 37, 38, 39, and supplies the high-voltage signal 11, the reset signal 12, and the detected signal 23 to the user board 1, bringing the user board 1 into the on-board writing mode. By activating the detected signal 23, the on-board writing host 9 keeps the user circuit 3 reset, i.e., keeps the serial interfaces 28, 29, 30 of the user circuit 3 at a high-impedance (Hi-Z) level.

According to the conventional arrangement, signals may possibly be mixed or shorted in the serial interfaces 37, 38, 39. According to the embodiment shown in FIG. 3, however, since the serial interfaces 28, 29, 30 are kept at the high-impedance level, no signals are mixed or shorted in the serial interfaces 37, 38, 39. Because the user circuit 3 remains reset, the output signal 16 from the malfunction monitoring device 8 remains inactive. Consequently, no reset signal is applied to the reset terminal 20 of the microcomputer 2 during the on-board writing mode. At this time, the reset signal 12 is inactive as can be seen from FIG. 4. As the user circuit 3 remains reset, no various drawbacks are developed therein. Therefore, data can properly be written into the flash memory 5.

In this embodiment, if the user circuit 3 remains reset in the on-board writing mode, the malfunction monitoring device 8 also remains reset. Accordingly, no reset signal is applied through the reset circuit 4, the OR gate 14, and the reset terminal 20 to the microcomputer 2 while in the on-board writing mode, with the result that data can reliably be written into the flash memory 5.

Similarly, if the user circuit 3 remains reset in the on-board writing mode, the serial interface function block 7 also remains reset. Therefore, since the user circuit 3 inactivates the serial interfaces 37, 38, 39, no signals are mixed or shorted in the serial interfaces 37, 38, 39 during the on-board writing mode, allowing data to be reliably written into the flash memory 5.

Furthermore, no various other shortcomings are developed, also allowing data to be reliably written into the flash memory 5.

Figure 5:
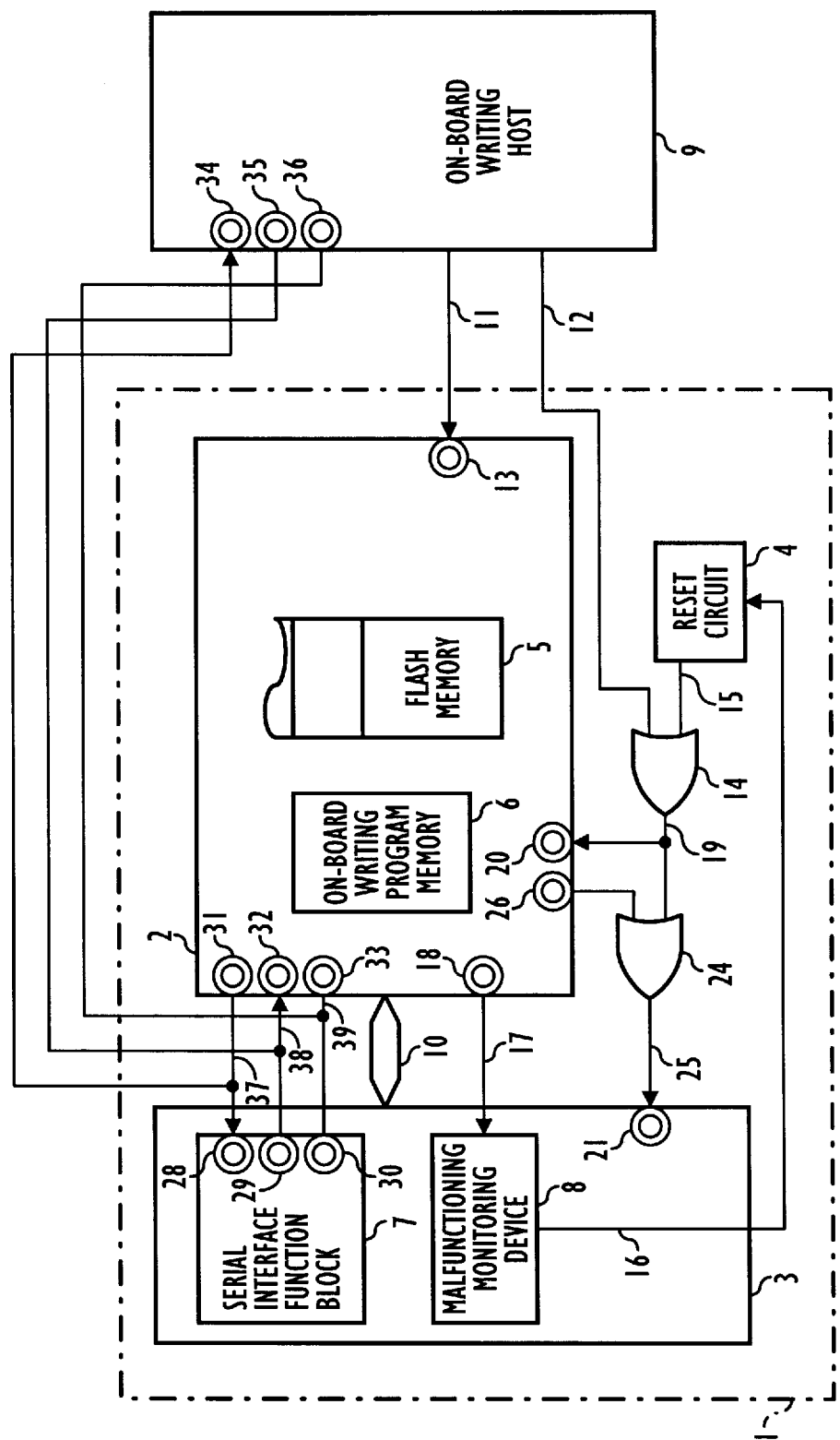
FIG. 5 is a block diagram of a user board and an on-board writing host, illustrative of a method of writing of data into an on-board microcomputer according to another embodiment of the present invention.

FIG. 5 shows in block form a user board 1 and an on-board writing host 9, illustrative of a method of writing of data into an on-board microcomputer according to another embodiment of the present invention. The user board 1 and the on-board writing host 9 shown in FIG. 5 differ from those shown in FIG. 3 in that the on-board writing host 9 does not have an on-board writing detector 22, and the microcomputer 2 has an output terminal 26 for outputting a detected signal 23 indicative of the on-board writing mode according to a command in the on-board writing program. The detected signal 23 outputted from the output terminal 26 is made active by the on-board writing program immediately before the on-board writing mode is started, and made inactive by the on-board writing program immediately after the on-board writing mode is finished. Other circuit details of the user board 1 and the on-board writing host 9 shown in FIG. 5 are identical to those shown in FIG. 3.

The user board 1 shown in FIG. 5 is controlled in the on-board writing mode in the same manner as shown in FIG. 3. In FIG. 3, the detected signal 23 is generated by a hardware implementation in the on-board writing host 9. In FIG. 5, however, the detected signal 23 outputted from the output terminal 26 is generated by a software implementation in the microcomputer 2. According to the embodiment shown in FIG. 5, therefore, the number of interfaces interconnecting the on-board writing host 9 and the microcomputer 2 may be smaller by one than that shown in FIG. 3, and the number of parts such as interface connectors of the user board 1 may be reduced.

Figure 6:
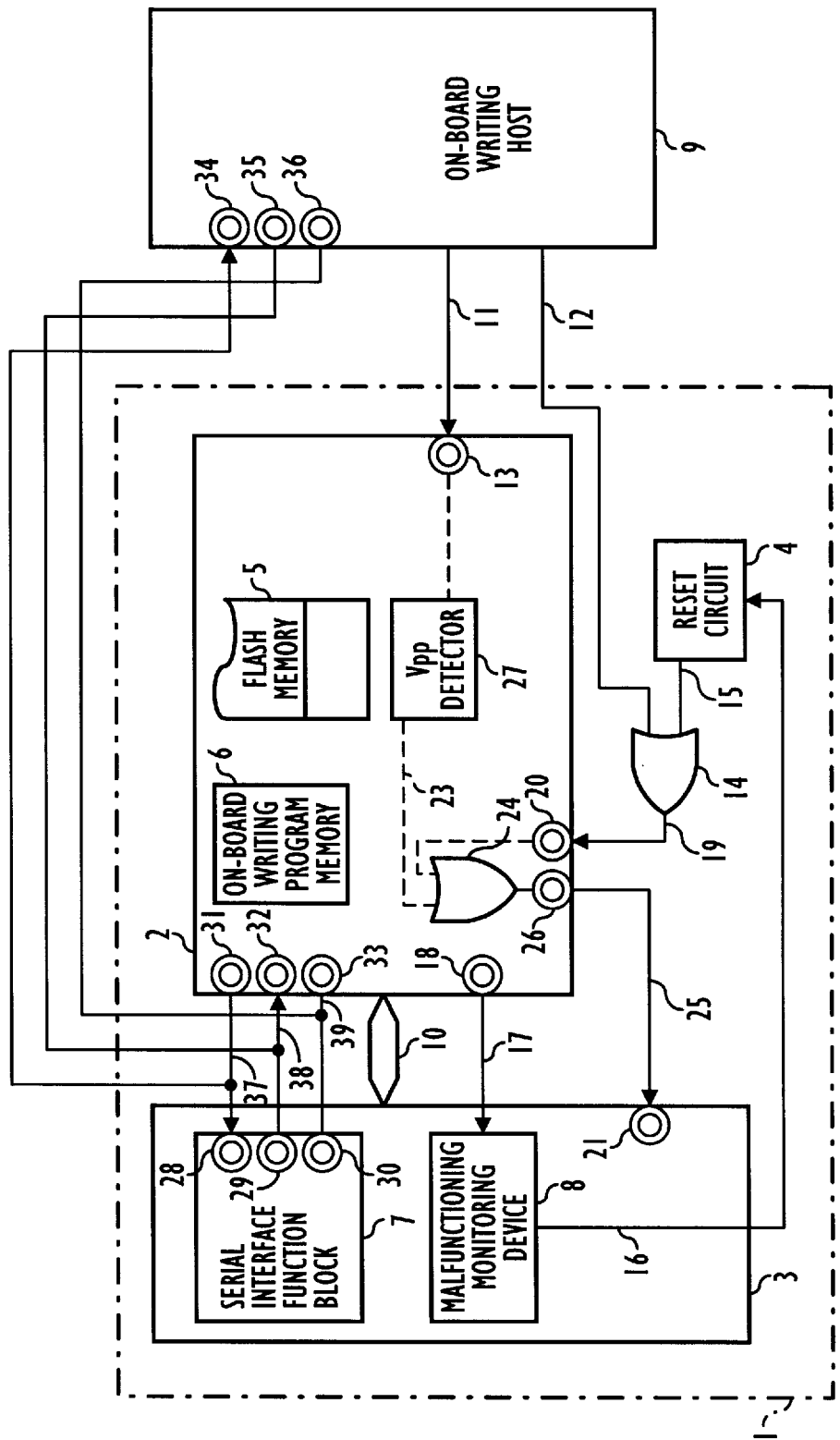
FIG. 6 is a block diagram of a user board and an on-board writing host, illustrative of a method of writing of data into an on-board microcomputer according to still another embodiment of the present invention.

FIG. 6 shows in block form a user board 1 and an on-board writing host 9, illustrative of a method of writing of data into an on-board microcomputer according to still another embodiment of the present invention. In the embodiment shown in FIG. 6, a detected signal 23 indicative of the on-board writing mode is generated by a hardware implementation in the microcomputer 2. Specifically, the microcomputer 2 has a high-voltage (Vpp) detector 27 which produces the detected signal 23 when it detects the high-voltage signal 11 from the on-board writing host 9. The second OR gate 24 is included in the microcomputer 2. The detected signal 23 from the high-voltage detector 27 and the output signal 19 supplied from the first OR gate 14 to the reset terminal 20 are ORed by the second OR gate 24 in the microcomputer 2. Therefore, when either the detected signal 23 or the output signal 19 is activated, the output terminal 26 connected to the OR gate 24 outputs a reset signal 25 to the reset terminal 21 of the user circuit 3.

The user board 1 shown in FIG. 6 is controlled in the on-board writing mode in the same manner as shown in FIG. 3. According to the embodiment shown in FIG. 6, while the detected signal 23 is generated by a hardware implementation as with the embodiment shown in FIG. 3, the detected signal 23 is generated specifically by the high-voltage detector 27 of the microcomputer 2. As a result, according to the embodiment shown in FIG. 6, the number of interfaces interconnecting the on-board writing host 9 and the microcomputer 2 may be smaller by one than that shown in FIG. 3. Since the second OR gate 24 is included in the microcomputer 2, the number of parts of the user board 1 may be smaller than that of the user board 1 shown in FIG. 5.

In each of the embodiments described above, the user circuit 3 is reset in its entirety. However, only a required portion of the user circuit 3 may be reset by the detected signal 23 in order to prevent various drawbacks from occurring.

In the conventional arrangement shown in FIG. 1, since the CPU of the microcomputer 2 cannot use the bus while in direct memory access control (DMAC) operation, the CPU cannot output a WRITE signal for initializing a monitoring timer. Accordingly, the monitoring timer is disabled during the DMAC operation. Specifically, since the monitoring timer comprises a counter, only the counting of the counter is stopped. The malfunction monitoring device 8, which serves to monitor malfunctioning of the main program, is not required to operate during the on-board writing mode in which the main program is not executed.

According to the embodiments of the present invention, the malfunction monitoring device 8 is not temporarily shut off, but is reset. As a consequence, the malfunction monitoring device 8 may be of any design. Since the user circuit 3 on the user board 1 can be reset in its entirety in the on-board writing mode, the problem of shorted or mixed signals in the serial interfaces 37, 38, 39 can be solved, preventing various drawbacks from occurring.

In the method of controlling the writing of data into the on-board microcomputer according to the present invention, as described above, since the output signal from the malfunction monitoring device 8 of the user circuit 3 is kept inactive during the on-board writing mode, the microcomputer 2 is not reset, allowing data to be reliably written into the flash memory 5 in the on-board writing mode.

Furthermore, during the on-board writing mode, the serial interfaces 28, 29, 30 of the user circuit 3 are kept at the high-impedance level thereby to prevent signals from being mixed or shorted in the serial interfaces 37, 38, 39 to prevent the user board 1 from being damaged. Accordingly, even though the serial interface function block 7 is included in the user circuit 3, data can reliably be written into the flash memory 5 in the on-board writing mode.

Moreover, since the user circuit 3 remains reset during the on-board writing mode, no shortcomings occur in any regions of the user circuit 3, allowing data to be reliably written into the flash memory 5.

Although certain preferred embodiments of the present invention have been shown and described in detail, it should be understood that various changes and modifications may be made therein without departing from the scope of the appended claims.

What is claimed is:

1. A method of controlling the writing of data, comprising the steps of:

providing a user board having a user circuit including a serial interface function block and a malfunction monitoring device, an on-board microcomputer including a flash memory which stores a control main program and an on-board writing program memory which stores an on-board writing program and connected to said user circuit through serial interfaces, a reset circuit for generating a reset signal in response to an output signal from said malfunction monitoring device, a first OR gate for ORing said reset signal from said reset circuit and a reset signal supplied from an on-board writing host for rewriting data stored in said flash memory, and a second OR gate for ORing an output signal from said first OR gate and a detected signal indicative of an on-board writing mode from said on-board writing host to reset the user circuit;

supplying a high-voltage signal having a voltage higher than a power supply voltage from said on-board writing host to energize said on-board writing program memory to thereby indicate a start of the on-board writing mode;

transmitting data to be written into said flash memory from said on-board writing host to said on-board microcomputer; and inhibiting operation of at least a part of said user circuit as long as said detected signal indicates the on-board writing mode.

2. A method according to claim 1, wherein said on-board writing host has an on-board writing detector for generating said detected signal, further comprising the step of outputting said detected signal to said second OR gate when said on-board writing detector detects the on-board writing mode.

3. A method of controlling the writing of data, comprising the steps of:

providing a user board having a user circuit including a serial interface function block and a malfunction monitoring device, an on-board microcomputer including a flash memory which stores a control main program and an on-board writing program memory which stores an on-board writing program and connected to said user circuit through serial interfaces, a reset circuit for generating a reset signal in response to an output signal from said malfunction monitoring device, a first OR gate for ORing said reset signal from said reset circuit and a reset signal supplied from an on-board writing host for rewriting data stored in said flash memory, and a second OR gate for ORing an output signal from said first OR gate and a detected signal indicative of an on-board writing mode from said on-board microcomputer to reset the user circuit;

supplying a high-voltage signal having a voltage higher than a power supply voltage from said on-board writing host to energize said on-board writing program memory to thereby indicate a start of the on-board writing mode;

transmitting data to be written into said flash memory from said on-board writing host to said on-board microcomputer; and preventing operation of at least a part of said user circuit as long as said detected signal indicates the on-board writing mode.

4. A method according to claim 3, wherein said on-board microcomputer 2 comprises means for generating said detected signal from high-voltage signal supplied from said on-board writing host and supplying the detected signal to said second OR gate.

5. A method of controlling the writing of data, comprising the steps of:

providing a user board having a user circuit including a serial interface function block and a malfunction monitoring device, a reset circuit for generating a reset signal in response to an output signal from said malfunction monitoring device, a first OR gate for ORing said reset signal from said reset circuit and a reset signal supplied from an on-board writing host, and a second OR gate for ORing a detected signal indicative of an on-board writing mode supplied from said high voltage detector and an output signal from said first OR gate, said on-board computer being connected to said user circuit through serial interfaces;

supplying a high-voltage signal having a voltage higher than a power supply voltage from said on-board writing host to energize said on-board writing program memory to thereby indicate a start of the on-board writing mode;

transmitting data to be written into said flash memory from said on-board writing host to said on-board microcomputer; and preventing operation of at least a part of said user circuit as long as said detected signal indicates the on-board writing mode.

6. A method of controlling the writing of data, comprising the steps of:

providing a user board having a user circuit including a data interface function block, a microcomputer including a memory which stores a program and an on-board writing host;

transmitting data to be written into said memory from said on-board writing host to said on-board microcomputer;

causing the on-board writing host to output a signal indicating an on board writing mode when said transmitting step is being preformed; and preventing said user circuit from supplying data to said memory as long as said on-board writing host outputs the signal indicating the on-board writing mode.

7. The method of claim 6, wherein the signal indicating an on-board writing mode is generated by an on-board writing detector of the on-board writing host.

8. The method of claim 6, wherein the signal indicating an on-board writing mode is generated using operating software of the on-board writing host.

9. A method of controlling the writing of data, comprising the steps of:

providing a user board having a user circuit including a data interface function block, a microcomputer including a memory which stores a program and an on-board writing host for rewriting data stored in said memory;

transmitting data to be written into said memory from said on-board writing host to said on-board microcomputer;

causing the microcomputer to output a signal indicating an on-board writing mode when said transmitting step is being performed; and preventing said user circuit from supplying data to said memory as long as said signal indicates the on-board writing mode.

\* \* \* \* \*